US006948319B2

(12) United States Patent
Hayakawa et al.

(10) Patent No.: US 6,948,319 B2
(45) Date of Patent: Sep. 27, 2005

(54) COGENERATION DEVICE

(75) Inventors: Tsutomu Hayakawa, Saitama (JP); Keiichi Samekawa, Saitama (JP); Yasuhiro Kume, Saitama (JP); Yuuji Mukano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/451,791

(22) PCT Filed: Jan. 21, 2002

(86) PCT No.: PCT/JP02/00385

§ 371 (c)(1), (2), (4) Date: Dec. 24, 2003

(87) PCT Pub. No.: WO02/059529

PCT Pub. Date: Aug. 1, 2002

(65) Prior Publication Data

US 2004/0079088 A1 Apr. 29, 2004

(30) Foreign Application Priority Data

| Jan. 23, 2001 | (JP) | ......................................... | 2001-014393 |
| Nov. 14, 2001 | (JP) | ......................................... | 2001-348681 |

(51) Int. Cl.⁷ .............................................. F24F 12/00
(52) U.S. Cl. ........................................ 60/784; 60/39.05
(58) Field of Search ............................... 60/39.05, 783, 60/784

(56) References Cited

U.S. PATENT DOCUMENTS 4,735,061 A    4/1988   Hsieh 4,827,711 A  *  5/1989   Isaksson ........................ 60/775

FOREIGN PATENT DOCUMENTS

| JP | 2-115639 | 9/1990 |
| JP | 4-342807 | 11/1992 |
| JP | 04-342807 | 11/1992 |
| JP | 7-208112 | 1/1994 |
| JP | 7-332749 | 12/1995 |
| JP | 2000-054854 A1 | 2/2000 |
| WO | WO 00/25009 | 5/2000 |

* cited by examiner

*Primary Examiner*—Ehud Gartenberg
(74) *Attorney, Agent, or Firm*—Arent Fox PLLC

(57) ABSTRACT

A cogeneration system is provided which includes a prime mover for obtaining power for driving a generator by combustion of a fuel, a waste heat boiler for recovering thermal energy from exhaust gas discharged from the prime mover, and a heat exchanger for heating air that is to be fed into an air conditioner by heat exchange with the exhaust gas discharged from the waste heat boiler. Drain water that is generated from the exhaust gas cooled by heat exchange in the air-heating heat exchanger (5) with the air that is to be fed into the air conditioner (30) is recovered by drain water recovery/supply means (36). The drain water recovery/supply means (36) supplies the drain water thus recovered to appliances (37, 38) that require comparatively high temperature water. Thermal energy can thus be recovered effectively from the drain water discharged from the heat exchanger on the downstream side of the waste heat boiler, thereby improving the efficiency of recovery of waste heat energy.

7 Claims, 2 Drawing Sheets

US 6,948,319 B2

COGENERATION DEVICE

CROSS-REFERENCE TO RELATED APPLICATION

This application is a National Stage entry of International Application No. PCT/JP02/00385, filed Jan. 21, 2002. The disclosure of the prior application is hereby incorporated herein in its entirety by reference.

FIELD OF THE INVENTION

The present invention relates to a cogeneration system that includes a prime mover for obtaining power for driving a generator by combustion of a fuel, a waste heat boiler for recovering thermal energy from exhaust gas discharged from the prime mover, and an air-heating heat exchanger for heating air that is to be fed into an air conditioner by heat exchange with the exhaust gas discharged from the waste heat boiler.

BACKGROUND ART

Such a cogeneration system is known from, for example, Japanese Patent Application Laid-open No. 4-342807 in which, after the thermal energy of exhaust gas discharged from a prime mover is recovered by a waste heat boiler, air that is to be used in an air conditioner is heated by heat exchange with the exhaust gas in an air-heating heat exchanger, thus recovering the waste thermal energy effectively.

In the air-heating heat exchanger, which carries out heat exchange with the exhaust gas on the downstream side of the waste heat boiler, part of the water contained in the exhaust gas is condensed by being cooled by heat exchange with the air that is to be fed into the air conditioner, and is discharged as drain water, and although the temperature of the drain water is expected to be comparatively high, there is no conventional system in which the thermal energy is recovered effectively from such drain water.

DISCLOSURE OF THE INVENTION

The present invention has been achieved in view of the above-mentioned circumstances, and it is an object thereof to provide a cogeneration system that recovers thermal energy effectively by acquiring drain water during heat exchange between exhaust gas discharged from a waste heat boiler and air that is to be used in an air conditioner, thus improving the efficiency of recovery of the waste thermal energy.

In order to achieve this object, in accordance with a first aspect of the present invention there is provided a cogeneration system that includes a prime mover for obtaining power for driving a generator by combustion of a fuel, a waste heat boiler for recovering thermal energy from exhaust gas discharged from the prime mover, and an air-heating heat exchanger for heating air that is to be fed into an air conditioner by heat exchange with the exhaust gas discharged from the waste heat boiler, characterized in that the system includes drain water recovery/supply means capable of recovering drain water generated from the exhaust gas cooled by heat exchange in the air-heating heat exchanger with the air that is to be fed into the air conditioner and supplying the drain water thus recovered to an appliance that requires comparatively high temperature water.

In accordance with the arrangement of the first aspect, the drain water recovered from the air-heating heat exchanger is utilized in the appliance that requires comparatively high temperature water, thus improving the efficiency of recovery of the waste thermal energy. That is, in the case where room temperature water is used, a heater is required, but since comparatively high temperature drain water can be supplied, consumption of extra energy can be avoided.

Furthermore, in accordance with a second aspect of the present invention, in addition to the first aspect, there is provided a cogeneration system wherein the system further includes a pure water generator for generating pure water for supply to the waste heat boiler, and a waste-water-heating heat exchanger for heating waste water from the pure water generator by heat exchange with the exhaust gas discharged from the waste heat boiler, the drain water recovery/supply means including a tank in which the waste water heated by the waste-water-heating heat exchanger and the drain water are mixed. In accordance with this arrangement, even when the drain water generated from the exhaust gas is alkaline, since the alkalinity can be weakened by dilution due to the mixing with the waste water from the pure water generator within the tank, its application can be extended by enabling the water within the tank to be utilized effectively in more appliances.

Moreover, in accordance with a third aspect of the present invention, in addition to the second aspect, there is provided a cogeneration system wherein the drain water recovery/supply means is arranged so as to be able to recover drain water generated from the exhaust gas cooled by heat exchange with the waste water in the waste-water-heating heat exchanger, and to supply the drain water to the appliance. In accordance with this arrangement, the water contained in the exhaust gas can be recovered more effectively, thereby further improving the efficiency of recovery of the waste thermal energy.

Furthermore, in accordance with a fourth aspect of the present invention, in addition to the second or third aspect, there is provided a cogeneration system wherein a bypass that bypasses the air-heating heat exchanger and switches over between opened and closed states according to the outside air temperature is connected, on either side of the air-heating heat exchanger, to an air conditioner air supply passage connected to the air conditioner. In accordance with this arrangement, changes according to the season in the amount of drain water and the temperature of the air conditioner that are required can be accommodated.

Moreover, in accordance with a fifth aspect of the present invention, in addition to the first or third aspect, there is provided a cogeneration system wherein the appliance is an air conditioner air humidifier. In accordance with this arrangement, the water contained in the exhaust gas can be recovered effectively and used in the air conditioner air humidifier.

Furthermore, in accordance with a sixth aspect of the present invention, in addition to the first or third aspect, there is provided a cogeneration system wherein the appliance is a hot water washer. In accordance with this arrangement, the water contained in the exhaust gas can be recovered effectively and used in the hot water washer.

Moreover, in accordance with a seventh aspect of the present invention, in addition to any one of the first to sixth aspects, there is provided a cogeneration system wherein the waste heat boiler is connected to a combustor of a gas turbine, which is the prime mover, to thereby supply a part of steam acquired by the waste heat boiler to the combustor. In accordance with this arrangement, by increasing the weight of a gas fed to the turbine via the combustor and increasing the rotational speed of the turbine, the capacity of the generator can be increased, and the steam returned to the gas turbine can be recovered effectively as drain water.

BRIEF DESCRIPTION OF DRAWINGS

FIG. 1 is an overall schematic diagram of a cogeneration system; and FIG. 2 is a schematic diagram showing the arrangement of a generator system.

BEST MODE FOR CARRYING OUT THE INVENTION

Figure 1:
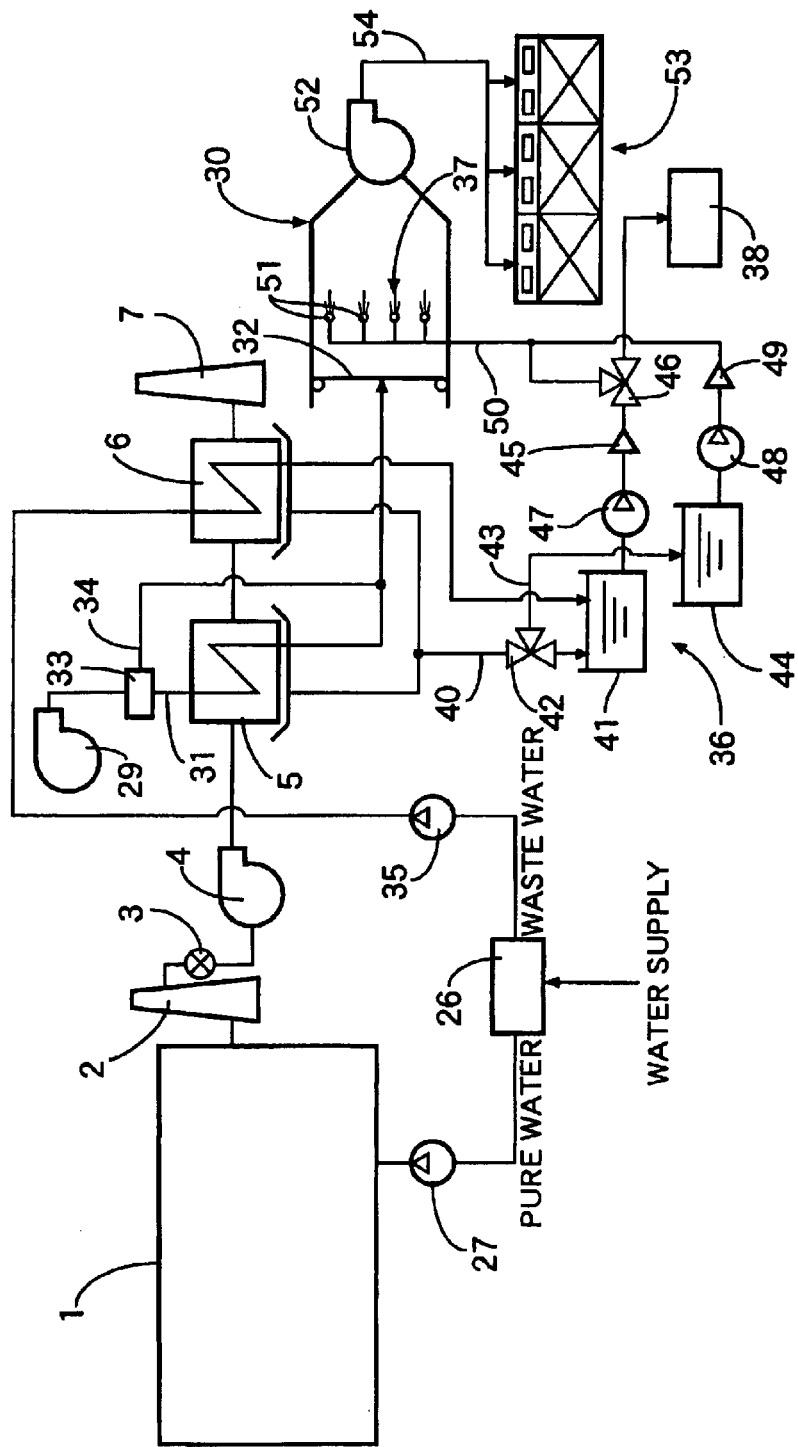
FIG. 1 and FIG. 2 illustrate one embodiment of the present invention.

Modes for carrying out the present invention are explained below by reference to one embodiment of the present invention illustrated in FIG. 1 and FIG. 2. Referring firstly to FIG. 1, exhaust gas discharged from a generator system 1 is directed to a stack 2. The induction side of an induction fan 4 is connected to the stack 2 via an open/close valve 3, and the discharge side of the induction fan 4 is connected to a stack 7 via an air-heating heat exchanger 5, and a waste-water-heating heat exchanger 6 connected to the downstream side of the air-heating heat exchanger 5.

Figure 2:
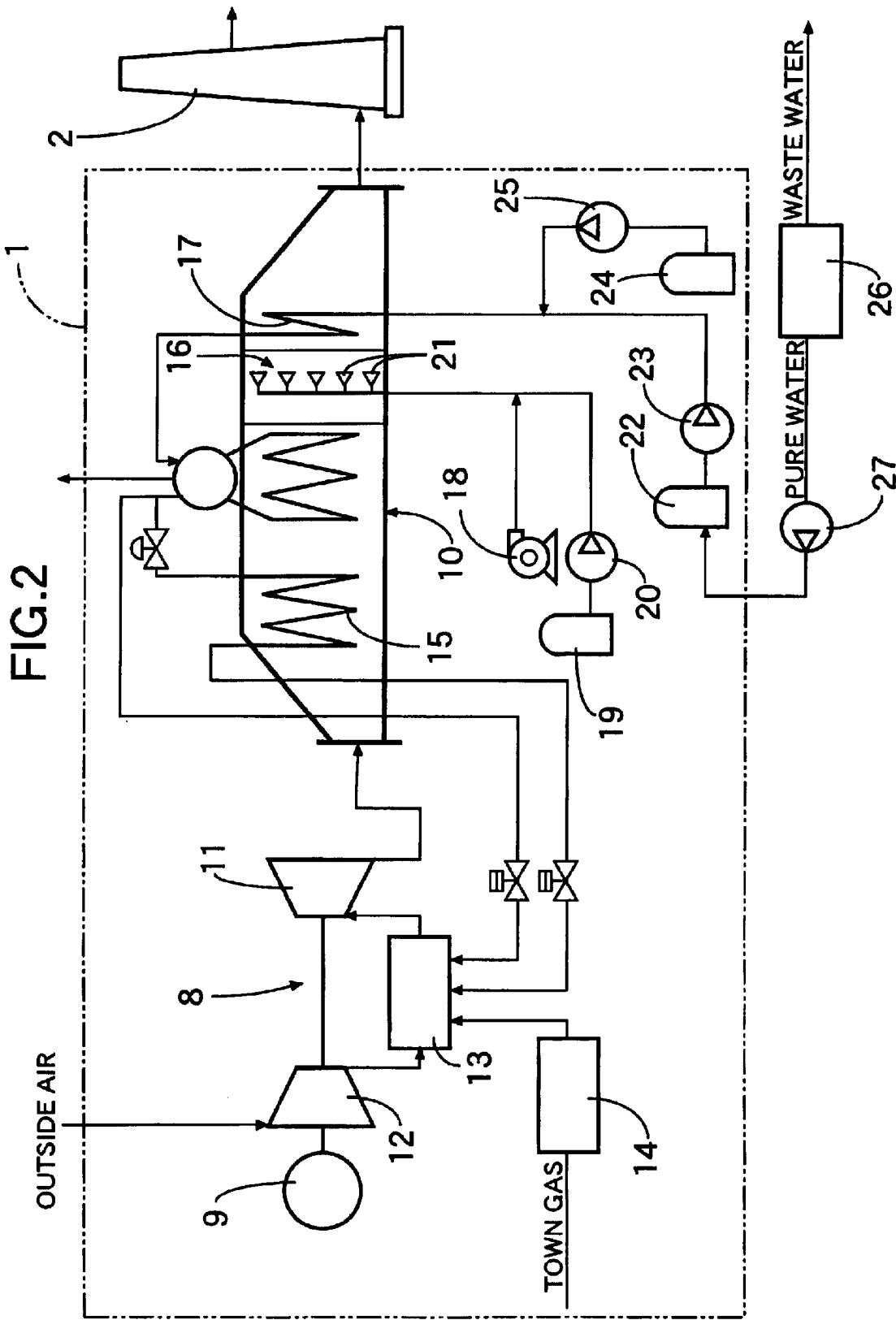

In FIG. 2, the generator system 1 includes a gas turbine 8, which is a prime mover, a generator 9 that is driven by the gas turbine 8, and a waste heat boiler 10 that recovers thermal energy by heat exchange with exhaust gas discharged from a combustor of the gas turbine 8. The exhaust gas discharged from the waste heat boiler 10 is directed to the stack 2.

The gas turbine 8 includes a turbine 11, a compressor 12 coaxially connected to the turbine 11, and the combustor 13. Supplied to the combustor 13 are air pressurized by the compressor 12, a fuel gas such as town gas compressed by a gas compressor 14, and also a part of steam acquired by the waste heat boiler 10.

An exhaust gas containing steam is discharged from the combustor 13 as a result of combustion of the fuel gas in the combustor 13, this exhaust gas rotates the turbine 11 to drive the generator 9, and a combustion exhaust gas discharged from the turbine 11 is directed to the waste heat boiler 10.

This waste heat boiler 10 includes a heater 15, a denitration device 16, and a preheater 17. The heater 15 heats part of the steam acquired by the waste heat boiler 10 by heat exchange with the exhaust gas from the turbine 11.

The steam heated by the heater 15 is supplied to the combustor 13 of the gas turbine 8. The denitration device 16 is arranged such that air fed by a blower 18 and ammonia supplied by a pump 20 from an ammonia tank 19 are sprayed via a plurality of nozzles 21, 21 into the waste heat boiler 10. $NO_x$ present in the exhaust gas from the combustor 13 and ammonia ($NH_3$) react with each other as in ($NO_x+NH_3=N_2+H_2O$) to thereby remove as much $NO_x$ as possible from the exhaust gas.

The preheater 17 is provided in the waste heat boiler 10 on the downstream side of the denitration device 16; pure water fed by a pump 23 from a pure water tank 22 is heated by heat exchange with the exhaust gas in the preheater 17, and supplied to the waste heat boiler 10. Pure water, from which calcium content is removed by a pure water generator 26, is supplied by a pump 27 to the pure water tank 22. NaOH is supplied by a pump 25 from a caustic soda tank 24 to the pure water that is to be supplied to the preheater 17 by the pump 23. This NaOH functions to protect the wall of the waste heat boiler 10 when the steam generated in the waste heat boiler 10 reaches the waste heat boiler 10 via the combustor 13.

In this way, in the generator system 1, part of the thermal energy of the exhaust gas discharged from the combustor 13 of the gas turbine 8 is recovered by converting the pure water into steam in the waste heat boiler 10. Part of the steam acquired by the waste heat boiler 10 is supplied to the combustor 13 as described above, and the remainder of the steam is used as plant steam. Moreover, the exhaust gas discharged from the waste heat boiler 10 is directed to the stack 2.

Referring again to FIG. 1, the air-heating heat exchanger 5 is provided partway along an air conditioner air supply passage 31 connecting a blower 29 to an air conditioner 30, and carries out heat exchange between air that is to be supplied to the air conditioner 30 from the blower 29 and the exhaust gas directed from the stack 2. The air heated by exchanging heat with the exhaust gas is fed via a filter 32 into the air conditioner 30 from the air-heating heat exchanger 5.

One end of a bypass 34 is connected to the air conditioner air supply passage 31 via switchover means 33 between the blower 29 and the air-heating heat exchanger 5, and the other end of the bypass 34 is connected to the air conditioner air supply passage 31 between the air-heating heat exchanger 5 and air conditioner 30.

The switchover means 33 can switch over between a first state in which the air from the blower 29 is made to flow toward the bypass 34 and a second state in which the air from the blower 29 is made to flow toward the air-heating heat exchanger 5. The first state is selected when the outside air temperature is comparatively high, and the second state is selected when the outside air temperature is comparatively low. That is, the bypass 34, which bypasses the air-heating heat exchanger 5 and switches over between opened and closed states according to the outside air temperature, is connected, on either side of the air-heating heat exchanger 5, to the air conditioner air supply passage 31 connected to the air conditioner 30.

The exhaust gas that has undergone heat exchange in the air-heating heat exchanger 5 is discharged to the outside through the stack 7 via the waste-water-heating heat exchanger 6. Supplied by a pump 35 to the waste-water-heating heat exchanger 6 is waste water generated in the pure water generator 26 for generating the pure water that is to be supplied to the waste heat boiler 10. This waste water is heated in the waste-water-heating heat exchanger 6 by heat exchange with the exhaust gas discharged from the air-heating heat exchanger 5.

The exhaust gas is cooled by heat exchange with air in the air-heating heat exchanger 5, and part of the water contained in the exhaust gas is condensed by this cooling and discharged as drain water from the air-heating heat exchanger 5. The exhaust gas is cooled by heat exchange with waste water in the waste-water-heating heat exchanger 6, and part of the water contained in the exhaust gas condenses within the waste-water-heating heat exchanger 6 and is discharged as drain water from the waste-water-heating heat exchanger 6.

The drain water from the air-heating heat exchanger 5 and the waste-water-heating heat exchanger 6 is then recovered by drain water recovery/supply means 36, and the drain water thus recovered is supplied by the drain water recovery/supply means 36 to an air conditioner air humidifier 37 or a hot water washer 38 for washing a vehicle body after completion of painting, which are appliances requiring comparatively high temperature water.

The drain water recovery/supply means 36 includes a pipeline 40 for directing the drain water from the air-heating heat exchanger 5 and the waste-water-heating heat exchanger 6, a first tank 41 to which the pipeline 40 is connected and to which the waste water heated in the waste-water-heating heat exchanger 6 is directed, a branch pipeline 43, one end of which is connected to the pipeline 40 partway along via a three-way valve 42, a second tank 44 to which the other end of the branch pipeline 43 is connected, a first pump 47, the intake side of which is connected to the first tank 41 and the discharge side of which is connected to the hot water washer 38 via a filter 45 and a three-way valve 46, a second pump 48, the intake side of which is connected to the second tank 44, and a pipeline 50 connected to the discharge side of the second pump 48 via a filter 49. The pipeline 50 is connected to a plurality of nozzles 51, 51 of the air conditioner humidifier 37 disposed within the air conditioner 30 on the downstream side of the filter 32. The discharge side of the first pump 47 is also connected to the pipeline 50 via the filter 45 and the three-way valve 46.

In accordance with the drain water recovery/supply means 36 having the above-mentioned arrangement, the drain water from the air-heating heat exchanger 5 and the waste-water-heating heat exchanger 6, and the waste water from the pure water generator 26 can be mixed within the first tank 41. The drain water generated from the exhaust gas is alkaline because ammonia has been sprayed into the exhaust gas in the denitration device 16 of the generator system 1 and the steam generated in the waste heat boiler 10 from pure water into which caustic soda has been injected is supplied to the combustor 13, but its alkalinity is weakened by dilution due to mixing with the waste water from the pure water generator 26 within the first tank 41.

A fan 52 is attached to the air conditioner 30, and the humidified air from the air conditioner 30 is supplied by the fan 52 to automobile painting equipment 53, etc. via an air-conditioning duct 54.

The operation of this embodiment is now explained. After the thermal energy of the exhaust gas discharged from the turbine 11 of the gas turbine 8 is recovered in the waste heat boiler 10, if the open/close valve 3 is open, the exhaust gas from the waste heat boiler 10 is discharged though the stack 7 via the air-heating heat exchanger 5 and the waste-water-heating heat exchanger 6.

In the air-heating heat exchanger 5, the air that is to be supplied to the air conditioner 30 is heated by heat exchange with the exhaust gas, and in the waste-water-heating heat exchanger 6, the waste water from the pure water generator 26 is heated by heat exchange with the exhaust gas, thereby recovering the waste thermal energy from the gas turbine 8 effectively.

Furthermore, in the air-heating heat exchanger 5, part of the water content in the exhaust gas is condensed by being cooled by heat exchange with air directed to the air conditioner 30, the water content thus condensed is discharged as comparatively high temperature drain water from the air-heating heat exchanger 5, and the drain water is temporarily stored in the tank 41 or 44 of the drain water recovery/supply means 36. Moreover, in the waste-water-heating heat exchanger 6, part of the water contained in the exhaust gas is condensed by being cooled by heat exchange with the waste water, the water content thus condensed is discharged as comparatively high temperature drain water from the waste-water-heating heat exchanger 6, and the drain water is temporarily stored in the tank 41 or 44 of the drain water recovery/supply means 36.

The comparatively high temperature drain water within the tank 41 or 44 is supplied to the nozzles 51, 51 of the air conditioner humidifier 37 by the pump 47 or 48 so as to humidify the air fed into the air conditioner humidifier 37, thus avoiding a decrease in the temperature of air-conditioning air and thereby further improving the efficiency of recovery of the waste thermal energy from the gas turbine 8. That is, simply adding room temperature water causes the temperature of the air-conditioning air to decrease, but by using comparatively high temperature drain water for humidification a decrease in the temperature of the air-conditioning air can be avoided.

The drain water recovered from the air-heating heat exchanger 5 can also be utilized in the hot water washer 38, which is an appliance requiring comparatively high temperature water, thus avoiding the consumption of extra energy. That is, when room temperature water is used, a heater is needed, but since comparatively high temperature drain water can be supplied, it is possible to avoid consuming extra energy, thereby further improving the efficiency of recovery of the waste thermal energy.

In this way, the drain water generated from the exhaust gas is recovered not only in the air-heating heat exchanger 5, but also in the waste-water-heating heat exchanger 6 on the downstream side of the air-heating heat exchanger 5, and it is therefore possible to recover water contained in the exhaust gas more effectively, thereby further improving the efficiency of recovery of the waste thermal energy.

Moreover, the waste water heated by the waste-water-heating heat exchanger 6, and the drain water from the air-heating heat exchanger 5 and the waste-water-heating heat exchanger 6 can be mixed in the tank 41 of the drain water recovery/supply means 36. Because of this, although the drain water generated from the exhaust gas is alkaline, since it is diluted within the tank 41 by mixing with the waste water from the pure water generator 26, the alkalinity is weakened, and the water within the tank 41 can be utilized effectively in more appliances, such as the hot water washer 38, in addition to the air conditioner humidifier 37, thereby extending the applications.

Furthermore, since the bypass 34 bypassing the air-heating heat exchanger 5 and switching over between opened and closed states according to the outside air temperature is connected, on either side of the air-heating heat exchanger 5, to the air conditioner air supply passage 31 connected to the air conditioner 30, changes according to the season in the amount of drain water and the air conditioner temperature required by the air conditioner humidifier 37 and the hot water washer 38 can be accommodated easily.

Moreover, the humidified air acquired by the air conditioner 30 is supplied to the automobile painting equipment 53 by the fan 52, and the drain water from the air-heating heat exchanger 5 and the waste-water-heating heat exchanger 6 can be utilized more effectively in the automobile painting equipment 53, in which it is important to maintain the temperature and the humidity constant.

Furthermore, since part of the steam acquired by the waste heat boiler 10 is supplied to the combustor 13 of the gas turbine 8, by increasing the weight of gas fed to the turbine 11 via the combustor 13 and increasing the rotational speed of the turbine 11, the capacity of the generator 9 can be increased, and the steam returned to the gas turbine 8 side can be recovered effectively as drain water.

Although an embodiment of the present invention is explained in detail above, the present invention is not limited to the above-mentioned embodiment and can be modified in a variety of ways without departing from the present invention described in the scope of the claims.

For example, in the above-mentioned embodiment, the prime mover driving the generator 9 is the gas turbine 8, but it is not limited thereto, and it may be a diesel engine. Furthermore, the humidified air from the air conditioner 30 can be used for heating each floor in a factory.

Moreover, in the above-mentioned embodiment, the waste-water-heating heat exchanger 6 is connected in line to the downstream side of the air-heating heat exchanger 5, but the air-heating heat exchanger 5 and the waste-water-heating heat exchanger 6 may be connected in parallel.

What is claimed is:

1. A cogeneration system that includes a prime mover (8) for obtaining power for driving a generator (9) by combustion of a fuel, a waste heat boiler (10) for recovering thermal energy from exhaust gas discharged from the prime mover (8), and an air-heating heat exchanger (5) for heating air that is to be fed into an air conditioner (30) by heat exchange with the exhaust gas discharged from the waste heat boiler (10), characterized in that the system comprises drain water recovery/supply means (36) capable of recovering drain water generated from the exhaust gas cooled by heat exchange in the air-heating heat exchanger (5) with the air that is to be fed into the air conditioner (30) and supplying the drain water thus recovered to an appliance (37, 38) that requires comparatively high temperature water.

2. The cogeneration system according to claim 1, wherein the system further comprises a pure water generator (26) for generating pure water for supply to the waste heat boiler (10), and a waste-water-heating heat exchanger (6) for heating waste water from the pure water generator (26) by heat exchange with the exhaust gas discharged from the waste heat boiler (10), the drain water recovery/supply means (36) comprising a tank (41) in which the waste water heated by the waste-water-heating heat exchanger (6) and the drain water are mixed.

3. The cogeneration system according to claim 2, wherein the drain water recovery/supply means (36) is arranged so as to be able to recover drain water generated from the exhaust gas cooled by heat exchange with the waste water in the waste-water-heating heat exchanger (6), and to supply the drain water to the appliance (37, 38).

4. The cogeneration system according to either claim 2 or 3, wherein a bypass (34), which bypasses the air-heating heat exchanger (5) and switches over between opened and closed states according to the outside air temperature, is connected, on either side of the air-heating heat exchanger (5), to an air conditioner air supply passage (31) connected to the air conditioner (30).

5. The cogeneration system according to either claim 1 or 3, wherein the appliance is an air conditioner air humidifier (37).

6. The cogeneration system according to either claim 1 or 3, wherein the appliance is a hot water washer (38).

7. The cogeneration system according to anyone of claims 1–3, wherein the waste heat boiler (10) is connected to a combustor (13) of a gas turbine, which is the prime mover (8), to thereby supply a part of steam acquired by the waste heat boiler (10) to the combustor (13).

* * * * *